(12) United States Patent
Saito et al.

(10) Patent No.: US 8,904,766 B2
(45) Date of Patent: Dec. 9, 2014

(54) EXHAUST GAS TREATMENT DEVICE

(75) Inventors: Tomoyuki Saito, Kasumigaura (JP);
Hiroyuki Kamata, Tsuchiura (JP);
Hiroki Sugawara, Kasumigaura (JP);
Toshihiro Abe, Tsukuba (JP); Shohei Kamiya, Kasumigaura (JP)

(73) Assignee: Hitachi Construction Machinery Co, Ltd., Tokyo (JP)

( * ) Notice: Subject to any disclaimer, the term of this patent is extended or adjusted under 35 U.S.C. 154(b) by 1090 days.

(21) Appl. No.: 12/936,618

(22) PCT Filed: Aug. 14, 2009

(86) PCT No.: PCT/JP2009/064358
§ 371 (c)(1),
(2), (4) Date: Oct. 6, 2010

(87) PCT Pub. No.: WO2010/026864
PCT Pub. Date: Mar. 11, 2010

(65) Prior Publication Data
US 2011/0023472 A1    Feb. 3, 2011

(30) Foreign Application Priority Data
Sep. 8, 2008 (JP) .................................. 2008-229723

(51) Int. Cl.
| | |
|---|---|
| *F01N 3/10* | (2006.01) |
| *F01N 1/00* | (2006.01) |
| *F01N 13/00* | (2010.01) |
| *F16L 23/032* | (2006.01) |
| *F16L 23/08* | (2006.01) |
| *F01N 13/18* | (2010.01) |
| *F01N 3/033* | (2006.01) |
| *F01N 3/035* | (2006.01) |

(52) U.S. Cl.
CPC ........... *F01N 3/0335* (2013.01); *F01N 2590/08* (2013.01); *F01N 3/035* (2013.01); *F01N 13/0097* (2013.01); *F01N 3/106* (2013.01); *F16L 23/032* (2013.01); *F16L 23/08* (2013.01); *Y02T 10/20* (2013.01); *F01N 13/1827* (2013.01); *F01N 13/1855* (2013.01)
USPC ............................................... 60/299; 60/324

(58) Field of Classification Search
CPC ............ F01N 13/0097; F01N 13/1855; F01N 13/1827; F01N 3/106; F01N 3/035; F16L 23/032; F16L 23/08; Y02T 10/20
USPC .................................... 60/297, 299, 311, 324
See application file for complete search history.

(56) References Cited

U.S. PATENT DOCUMENTS

| | | | | |
|---|---|---|---|---|
| 5,408,827 | A * | 4/1995 | Holtermann et al. | 60/298 |
| 5,414,993 | A * | 5/1995 | Kon | 60/272 |
| 7,500,356 | B2 * | 3/2009 | Hirata et al. | 60/286 |
| 2007/0000240 | A1 | 1/2007 | Hirata et al. | |

FOREIGN PATENT DOCUMENTS

| | | |
|---|---|---|
| JP | 8-108076 A | 4/1996 |
| JP | 2594265 Y2 | 2/1999 |

(Continued)

*Primary Examiner* — Thomas Denion
*Assistant Examiner* — Diem Tran
(74) *Attorney, Agent, or Firm* — Mattingly & Malur, PC

(57) ABSTRACT

Front and rear side flange portions of a filter accommodating cylinder are provided with positioning pins. A flange portion of an upstream cylinder is provided with a notched groove and a flange portion of a downstream cylinder is provided with a notched groove. In consequence, when the filter accommodating cylinder is connected between the upstream cylinder and the downstream cylinder, each of the positioning pins disposed at the front and rear flange portions is engaged with each notched groove of the upstream cylinder and the downstream cylinder. The filter accommodating cylinder can be positioned to be coaxial with the upstream cylinder and the downstream cylinder. As a result, after performing a cleaning operation to a DPF, an operation of once again connecting the filter accommodating cylinder between the upstream cylinder and the downstream cylinder can be quickly and easily performed.

5 Claims, 13 Drawing Sheets

(56) References Cited

FOREIGN PATENT DOCUMENTS

| JP | 2001-73756 | A | | 3/2001 |
| JP | 2003-120277 | | * | 4/2003 |
| JP | 2003-120277 | A | | 4/2003 |
| JP | 2003-172120 | A | | 6/2003 |
| JP | 2005-256615 | A | | 9/2005 |
| JP | 2007-192328 | A | | 8/2007 |

* cited by examiner

EXHAUST GAS TREATMENT DEVICE

TECHNICAL FIELD

The present invention relates to an exhaust gas treatment device which is suitably used for reducing exhaust noise of exhaust gas emitted from, for example, an engine, and for removing harmful substances contained in the exhaust gas.

BACKGROUND ART

Generally, a construction machine such as a hydraulic excavator is constituted by an automotive lower traveling structure, an upper revolving structure which is swingably mounted on the lower traveling structure, and a working mechanism liftably mounted on the front side of the upper revolving structure. The upper revolving structure has an engine mounted on the rear side of a revolving frame to drive a hydraulic pump, and has a cab, a fuel tank, an operating oil tank, and the like mounted on the front side of the revolving frame.

Generally, a diesel engine is used as the engine of a hydraulic excavator. It is known that the diesel engine emits harmful substances such as a particulate matter (PM) and nitrogen oxides (NOx), and the like. Accordingly, the hydraulic excavator is so constructed as to be provided with an exhaust gas treatment device in an exhaust pipe for forming an exhaust gas passage of the engine.

This exhaust gas treatment device has treatment members such as a particulate matter removing filter (generally called a diesel particulate filter, abbreviated as DPF) for capturing and removing the particulate matter in the exhaust gas, a selective reduction catalyst which purifies nitrogen oxides (NOx) by use of a urea water solution, and an oxidation catalyst for oxidizing and removing carbon monoxide (CO) and hydrocarbons (HC) (see, for example, Patent Literature 1: Japanese Patent Laid-Open No. 2003-120277 A).

Here, the exhaust gas treatment device according to Patent Literature 1 is comprised of, for example, an upstream cylinder disposed on an upstream side in the flowing direction of exhaust gas of an engine, a downstream cylinder disposed on the downstream side, and a purifying part cylinder provided in series between these cylinders. And treatment members, including a DPF, an oxidation catalyst, a selective reduction catalyst, and the like, are accommodated in this purifying part cylinder. The upstream cylinder, the purifying part cylinder, and the downstream cylinder are arranged to be mounted to a structure such as the engine disposed in the upper revolving structure in a state of being connected in series with each other through means such as flange connections.

SUMMARY OF THE INVENTION

Incidentally, since the DPF for effecting the purification treatment of exhaust gas captures the particulate matter in the exhaust gas, it is necessary to perform cleaning operation for periodically removing the captured and deposited particulate matter. Here, in performing the cleaning operation of the DPF, in a state in which the upstream cylinder and the downstream cylinder are removed from the purifying part cylinder, the purifying part cylinder is removed from a structure such as the engine, and the DPF accommodated in this purifying part cylinder is taken out to the outside to perform cleaning.

Then, after the DPF for which cleaning has been completed is fitted in the purifying part cylinder, the purifying part cylinder is mounted again to the structure such as the engine, and the upstream cylinder and the downstream cylinder are fitted to the purifying part cylinder.

However, with the above-described exhaust gas treatment device according to Patent Literature 1, the purifying part cylinder with the DPF accommodated therein is mounted to the engine by use of U-bolts and nuts. For this reason, when the purifying part cylinder is removed, it is necessary to remove the flange portions of the purifying part cylinder from the flange portions of the upstream cylinder and the downstream cylinder and then remove the U-bolts and nuts fixing the purifying part cylinder to the engine side.

As a result, at the time of performing the cleaning operation, inspection operation, and repair operation, with respect to the DPF, time and trouble are required in the operation of mounting and removing the purifying part cylinder incorporating this DPF with respect to the upstream cylinder and the downstream cylinder. Therefore, there is a problem in that the operational efficiency in the cleaning operation declines undesirably.

In view of the above-discussed problems with the prior art, it is an object of the present invention to provide an exhaust gas treatment device which is capable of easily mounting and removing the purifying part cylinder incorporating treatment members from the upstream cylinder and the downstream cylinder, thereby making it possible to enhance the operational efficiency in the cleaning operation with respect to the treatment members.

(1) To overcome the above-described problems, the present invention is applied to an exhaust gas treatment device comprising an upstream cylinder located at an exhaust gas passage in an engine mounted on a vehicle body, a downstream cylinder located on a downstream side of the upstream cylinder, and a purifying part cylinder mounted in an axis line direction in series and detachably connected between the upstream cylinder and the downstream cylinder, and accommodating a treatment member therein for purifying an exhaust gas.

The feature of the construction adopted by the present invention lies in that the upstream cylinder, the downstream cylinder and the purifying part cylinder are provided with flange portions having a flat connecting surface disposed at cylinder end portions to be connected to oppose with each other, the front side flange portion and the rear side flange portion of the purifying part cylinder are provided with positioning pins projecting respectively toward the upstream cylinder and the downstream cylinder from the connecting surface, and the flange portion of the upstream cylinder and the flange portion of the downstream cylinder are provided with notched grooves for positioning the purifying part cylinder to the upstream cylinder and the downstream cylinder by engaging with the positioning pins.

As a result of such construction, when the purifying part cylinder is inserted between the upstream cylinder and the downstream cylinder, each of the positioning pins disposed at the flange portions of the purifying part cylinder is engaged with each of the notched grooves disposed at the flange portions of the upstream cylinder and the downstream cylinder. At the time of thus connecting the purifying part cylinder between the upstream cylinder and the downstream cylinder, the positioning pin and the notched groove can be engaged with each other to position the purifying part cylinder coaxially with the upstream cylinder and the downstream cylinder, thereby connecting the upstream cylinder, the downstream cylinder and the purifying part cylinder in series.

Accordingly, after removing the purifying part cylinder from the upstream cylinder and the downstream cylinder and performing a cleaning operation such as an inspection operation and a repair operation to a treatment member accommodated in the purifying part cylinder, an operation of once again connecting the purifying part cylinder between the upstream cylinder and the downstream cylinder can be quickly and easily performed to enhance an operational efficiency of performing the cleaning operation to the treatment member.

(2) The present invention is characterized in that the flange portion of the upstream cylinder, the flange portion of the downstream cylinder and the flange portion of the purifying part cylinder each are formed as the connecting surface to be flat in a direction perpendicular to an axis line of each.

With this construction, the axis line of the upstream cylinder and the axis line of the purifying part cylinder can be made to correspond to each other by contacting the flange portion of the upstream cylinder with the flange portion of the purifying part cylinder. The axis line of the downstream cylinder and the axis line of the purifying part cylinder can be made to correspond to each other by contacting the flange portion of the downstream cylinder with the flange portion of the purifying part cylinder.

(3) The present invention is characterized in that gaskets are disposed respectively between the upstream cylinder and the purifying part cylinder and between the downstream cylinder and the purifying part cylinder, the each gasket is provided with a pin passage hole into which the positioning pin is inserted, and the positioning pins respectively are engaged with the notched groove of the upstream cylinder and the notched groove of the downstream cylinder in a state where the pin passage hole of the each gasket is inserted into the positioning pin.

With this construction, in a state where the pin passage hole of the gasket is inserted into the positioning pin disposed in the purifying part cylinder, the gasket is temporarily fixed to the flange portion of the purifying part cylinder by inserting the purifying part cylinder between the upstream cylinder and the downstream cylinder. Therefore, at the time of performing an operation of connecting the purifying part cylinder between the upstream cylinder and the downstream cylinder, the operation of disposing the gasket between the upstream cylinder and the purifying part cylinder and the operation of disposing the gasket between the downstream cylinder and the purifying part cylinder can be simultaneously performed, further increasing an operational efficiency at the time of connecting the purifying part cylinder between the upstream cylinder and the downstream cylinder through the gaskets.

(4) In this case, according to the present invention, the positioning pin is provided with an engaging portion with which the gasket is engaged in a state where the pin passage hole of the gasket is inserted into the positioning pin.

With this construction, when the pin passage hole of the gasket is inserted into the positioning pin of the purifying part cylinder, a peripheral edge portion of the pin passage hole in the gasket latches on the engaging portion of the positioning pin, which can restrict the gasket to move in an axial direction of the positioning pin. In consequence, at the time of connecting the purifying part cylinder between the upstream cylinder and the downstream cylinder, an inadvertent disengagement of the gasket from the positioning pin of the purifying part cylinder can be restricted to securely dispose the gaskets between the upstream cylinder, the downstream cylinder and the purifying part cylinder.

(5) Further, according to the present invention, the upstream cylinder and the downstream cylinder are fixed through a support member to the side of the vehicle body. According to this construction, since the upstream cylinder and the downstream cylinder are fixed through the support member to the side of the vehicle body, it is not necessary to fix the purifying part cylinder connected between the upstream cylinder and the downstream cylinder to the side of the vehicle body. In consequence, since only the purifying part cylinder can be removed independently in a state where the upstream cylinder and the downstream cylinder are fixed to the side of the vehicle body, an operational efficiency at the time of performing a cleaning operation to the treatment member accommodated in the purifying part cylinder can be enhanced.

DESCRIPTION OF REFERENCE NUMERALS

Figure 1:
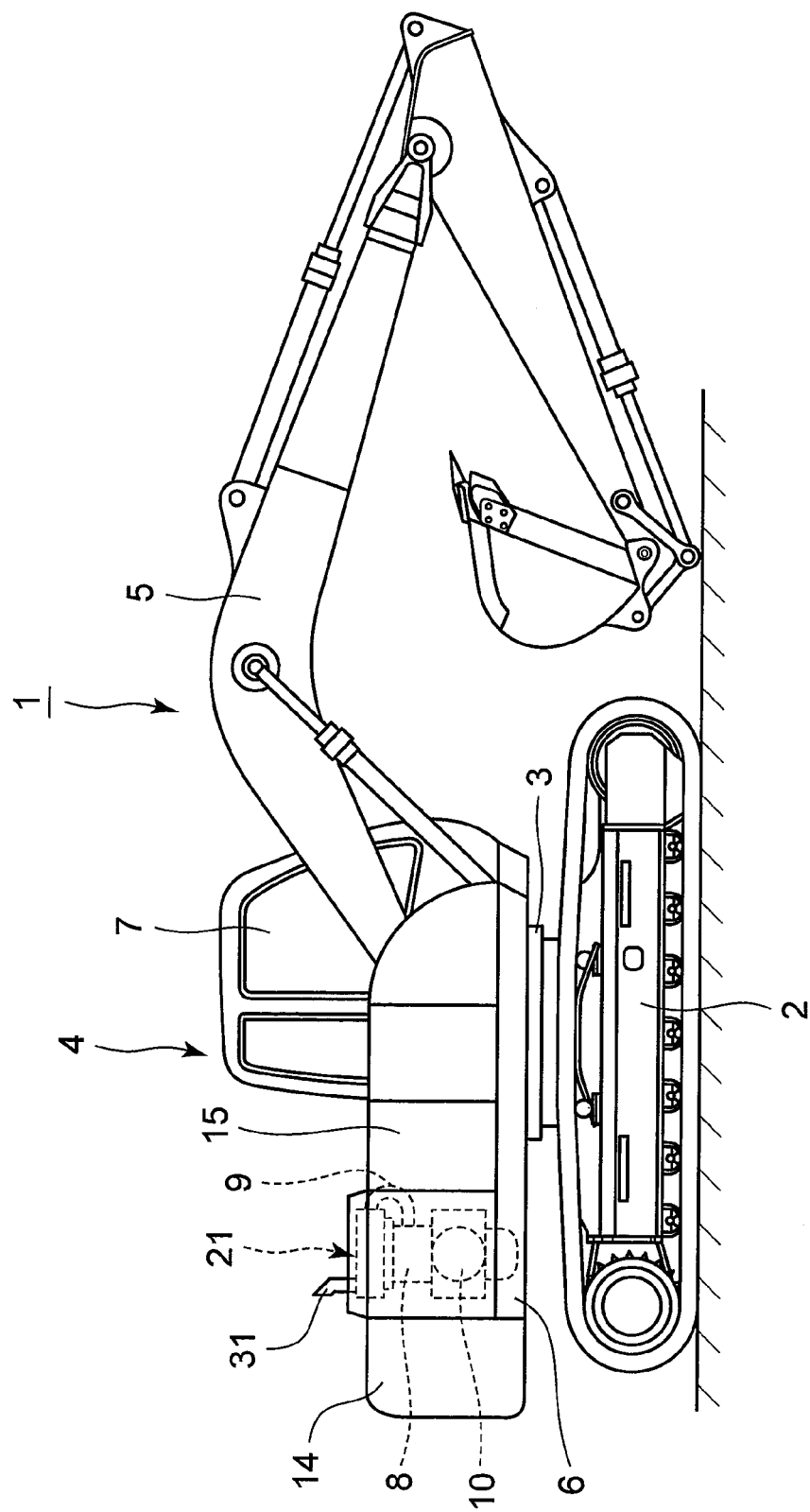
FIG. 1 is a front view illustrating a hydraulic excavator equipped with an exhaust gas treatment device in accordance with a first embodiment of the present invention.

1: Hydraulic excavator
2: Lower traveling structure (Vehicle body)
4: Upper revolving structure (Vehicle body)

8: Engine
9: Exhaust pipe (Exhaust gas passage)
21: Exhaust gas treatment device
22: Upper cylinder
23, 29, 34: Cylindrical case
23C, 29C: Flange portion
23D, 29D, 34D, 34E: Connecting surface
24, 30: Notched groove
26: Oxidation catalyst (Treatment member)
27, 32: Support leg (Support member)
28: Downstream cylinder
33: Filter accommodating cylinder (Purifying part cylinder)
34B: Front side flange portion
34C: Rear side flange portion
35: DPF (Treatment member)
39: Gasket
39A: Pin passage hole
40: Positioning pin
41: Recessed portion (Engaging portion)
41A: Groove bottom surface
41B: Vertical surface
41C: Inclined surface
42: Clamping device

MODE OF CARRYING OUT THE INVENTION

Hereafter, the embodiment of an exhaust gas treatment device in accordance with the present invention is described more particularly with reference to the accompanying drawings, by citing as an example a case in which the exhaust gas treatment device is applied to a hydraulic excavator.

In this embodiment, a particulate matter removing device (PM removing device) for removing particulate matter (PM) emitted from an engine is illustrated as an example of the exhaust gas treatment device.

The exhaust gas treatment device used in this embodiment is constructed such that three cylinders, namely, an upstream cylinder with an oxidation catalyst and a muffler accommodated therein, a downstream cylinder with a muffler accommodated therein, and a filter accommodating cylinder with a DPF accommodated therein, are connected together in series by use of clamping devices each having a V-shape, and are mounted to the engine side by means of support legs.

In the figure, denoted at 1 is a hydraulic excavator as a representative example of a construction machine which constitutes a vehicle body to which the present embodiment is applied. Here, this hydraulic excavator 1 is largely constituted by a crawler type automotive lower traveling structure 2, an upper revolving structure 4 which is swingably mounted on the lower traveling structure 2 through a revolving apparatus 3 and constitutes a vehicle body together with the lower traveling structure 2, and a working mechanism 5 liftably mounted on the front portion side of the upper revolving structure 4 to perform an excavating operation or the like. The upper revolving structure 4 is constituted by a revolving frame 6, a cab 7, an engine 8, and an exhaust gas treatment device 21, which will be described hereinafter.

Figure 2:
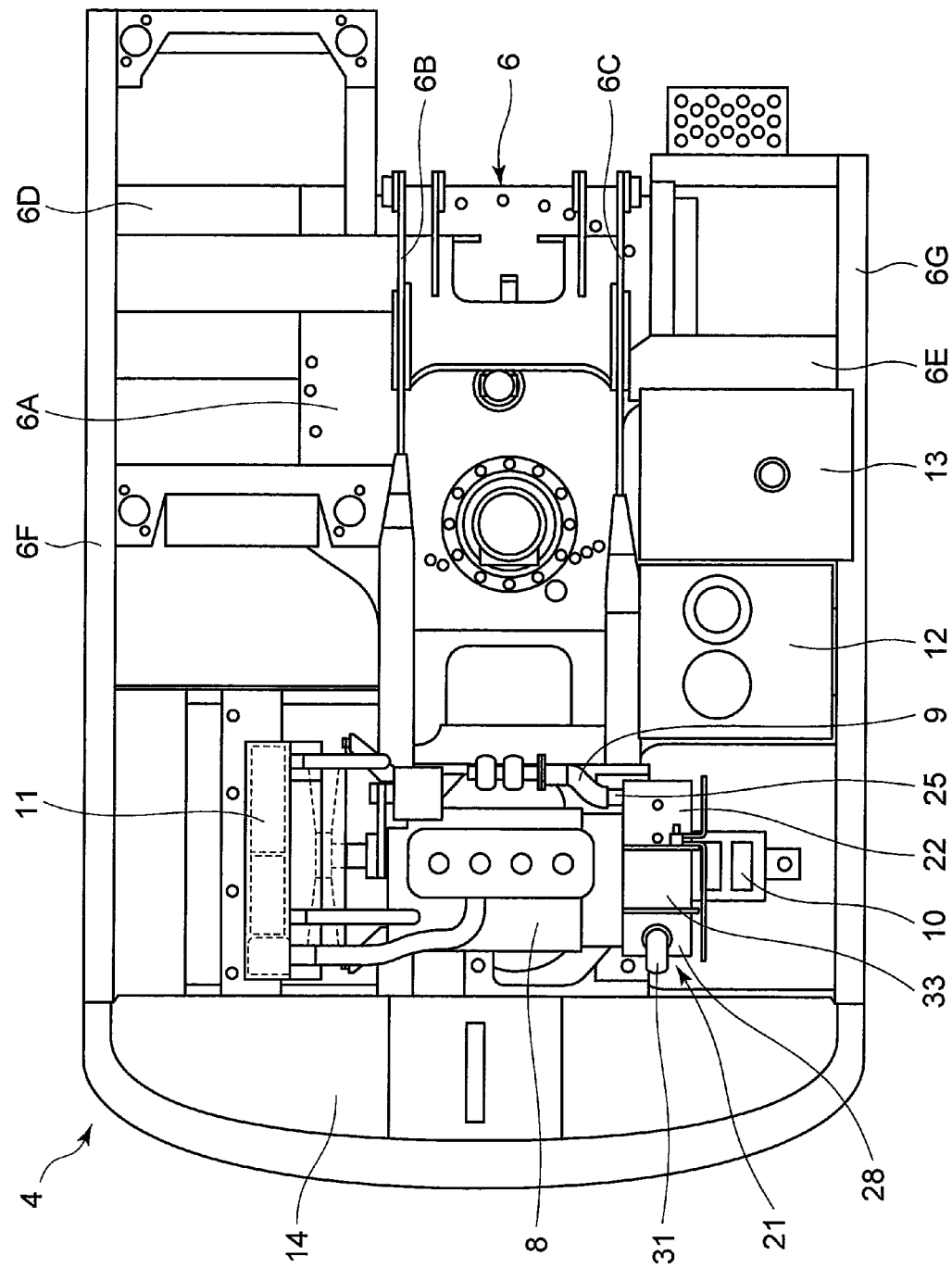
FIG. 2 is a plan view illustrating in enlarged form an upper revolving structure with a cab and a housing cover omitted.

Denoted at 6 is the revolving frame serving as a base of the upper revolving structure 4. The revolving frame 6 constitutes a rigid supporting structure and is mounted on the lower traveling structure 2 through the revolving apparatus 3. Here, as shown in FIG. 2, the revolving frame 6 is largely constituted by a thick-walled bottom plate 6A extending in the front and rear directions, a left vertical plate 6B and a right vertical plate 6C erected on the bottom plate 6A and extending in the front and rear directions with a predetermined interval therebetween in the right and left directions, a plurality of left extension beams 6D extending from the left vertical plate 6B in the leftward direction, a plurality of right extension beams 6E extending from the right vertical plate 6C in the rightward direction, a left side frame 6F secured to distal ends of each left extension beam 6D and extending in the front and rear directions, and a right side frame 6G secured to distal ends of each right extension beam 6E and extending in the front and rear directions.

Indicated at 7 is the cab (see FIG. 1) which is mounted on the left front portion side of the revolving frame 6, and the cab 7 constitutes an operator's operation room. A driver's seat in which the operator is to be seated, various operation levers (none are shown) and the like are disposed inside the cab 7.

Indicated at 8 is the engine which is mounted in a transversely mounted state on the rear side of the revolving frame 6. This engine 8 is constituted by, for example, a diesel engine. As shown in FIG. 2, an exhaust pipe 9, which constitutes a portion of an exhaust gas passage for emitting exhaust gas, is provided on the right side of the engine 8, and the below-described exhaust gas treatment device 21 is mounted at an intermediate portion of the exhaust pipe 9.

The engine 8 is highly efficient and excels in durability, and yet undesirably emits harmful substances such as a particulate matter (PM), nitrogen oxides (NOx), and carbon monoxide (CO) together with the exhaust gas. Accordingly, the exhaust gas treatment device 21 which is mounted in the exhaust pipe 9 is comprised of an oxidation catalyst 26 for oxidizing and removing carbon monoxide (CO) and the like and a DPF 35 for capturing and removing the particulate matter, which will be described hereinafter.

Figure 4:
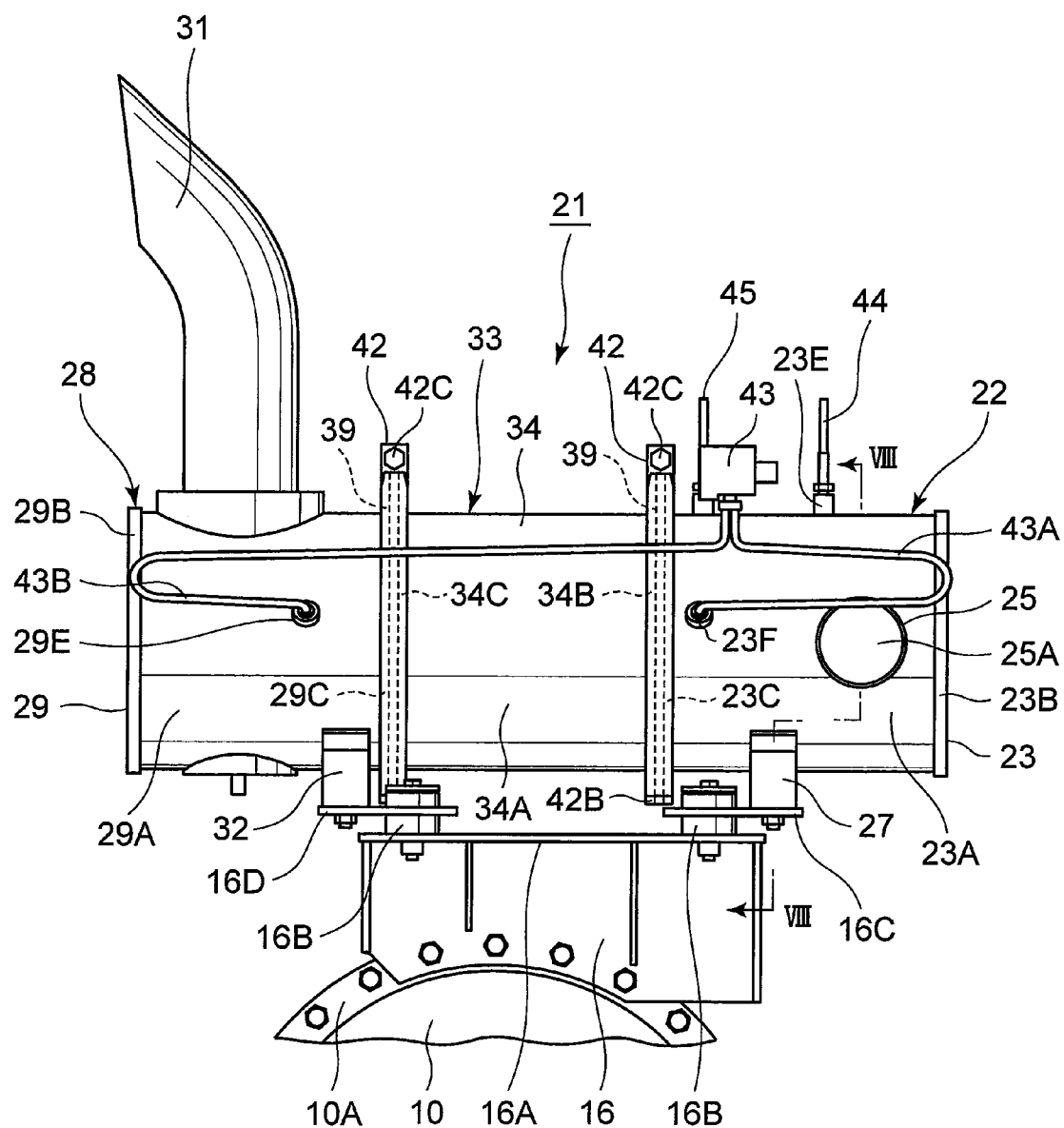
FIG. 4 is a front view illustrating the exhaust gas treatment device together with a hydraulic pump.

Indicated at 10 is a hydraulic pump mounted on the right side of the engine 8, and the hydraulic pump 10 is driven by the engine 8 to thereby deliver working pressure oil to various hydraulic actuators mounted on the hydraulic excavator 1. As shown in FIG. 4, as for the hydraulic pump 10, a left end portion opposing the engine 8 serves as a flange portion 10A, and this flange portion 10A is bolted to the engine 8. At the time of mounting the flange portion 10A in the hydraulic pump 10 to the engine 8, a treatment device supporting bracket 16 to be described later is constituted to be mounted together.

Indicated at 11 is a heat exchanger provided to be positioned at the left side of the engine 8, and the heat exchanger 11 is constituted by a radiator, an oil cooler, an intercooler and the like to radiate the heat of the cooling medium into cooling air which is supplied during the operation of the engine 8, thereby cooling engine cooling water, operating oil, and supercharged air.

Indicated at 12 is an operating oil tank which is mounted on the right side of the revolving frame 6 to be positioned at the front side of the hydraulic pump 10. The operating oil tank 12 stores operating oil which is supplied to the hydraulic pump 10. Indicated at 13 is a fuel tank which is provided on the front side of the operating oil tank 12, and this fuel tank 13 stores therein fuel which is supplied to the engine 8.

Indicated at 14 is a counterweight which is mounted on a rear end portion of the revolving frame 6 to be positioned at the rear side of the engine 8. This counterweight 14 is for keeping a weight balance with the working mechanism 5. A housing cover 15 is disposed on the front side of the counterweight 14, and the housing cover 15 accommodates the engine 8, the hydraulic pump 10, the heat exchanger 11 and the like.

Indicated at 16 is a treatment device supporting bracket provided to be positioned at the right side of the engine 8. The treatment device supporting bracket 16 constitutes a structure at the side of the upper revolving structure 4 for supporting the exhaust gas treatment device 21 to be described later. The treatment device supporting bracket 16 is largely constituted by a support base 16A which is mounted on the engine 8 together with the flange portion 10A of the hydraulic pump 10, and a front side mounting plate 16C and a rear side mounting plate 16D which are supported on the support base 16A disposed with an interval in a front and rear directions in a vibration isolated manner through a plurality of vibration isolating members 16B (only two are shown).

Next, the exhaust gas treatment device for purifying the exhaust gas which is emitted from the engine 8 will be described.

Designated at 21 is the exhaust gas treatment device located on the upper right side of the engine 8 and connected to the exhaust pipe 9. The exhaust gas treatment device 21 together with the exhaust pipe 9 constitutes an exhaust gas passage to remove harmful substances contained in the exhaust gas during a period where the exhaust gas flows from the upstream side to the downstream side of the exhaust gas passage. The exhaust gas treatment device 21 is disposed in a longitudinally mounted state in which it extends in the front and rear directions above the engine 8 so as to set its front side as an upstream side and the rear side as a downstream side in a front and rear directions (see FIG. 2).

Figure 5:
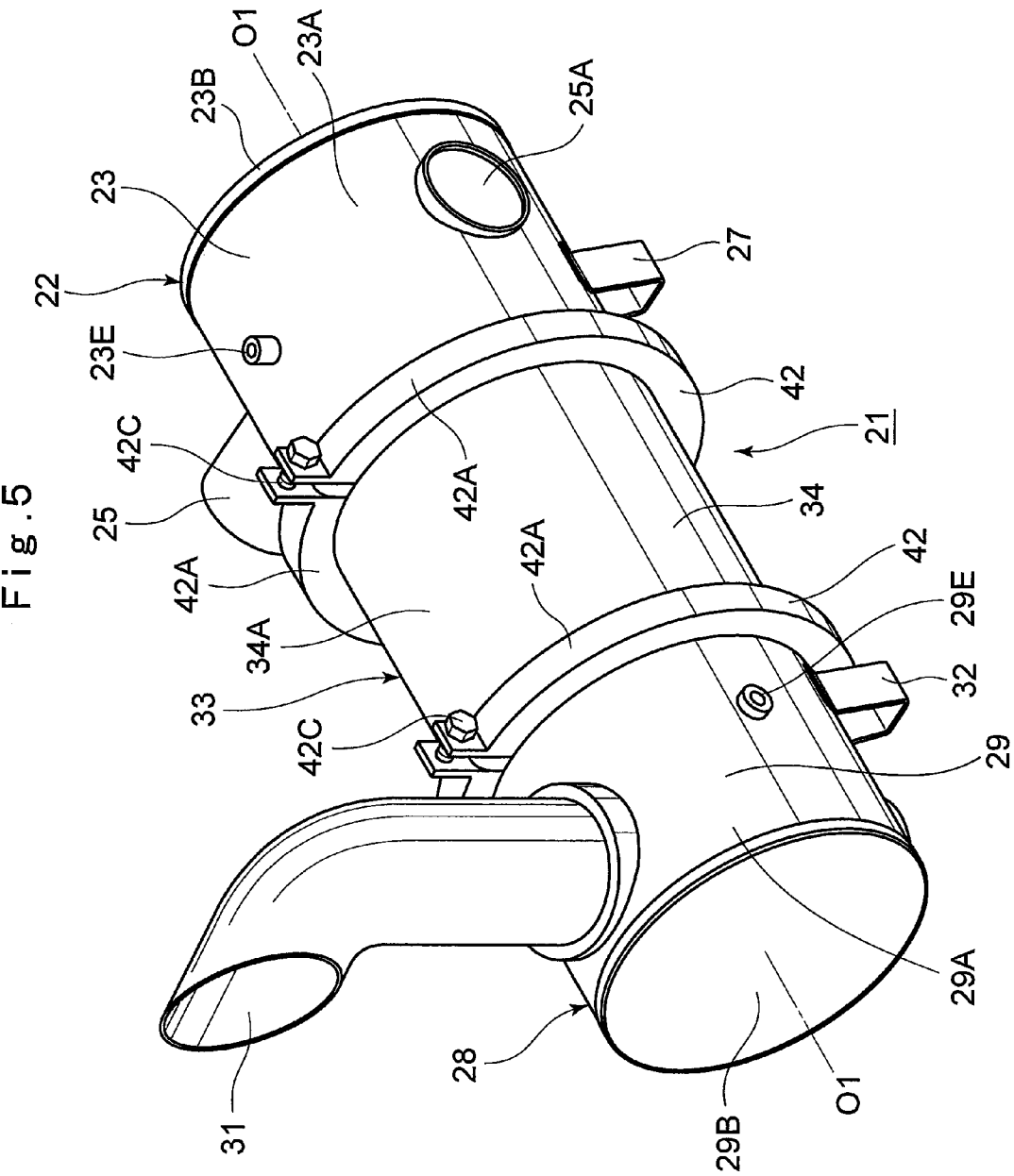
FIG. 5 is a perspective view illustrating the exhaust gas treatment device as a single unit.
Figure 6:
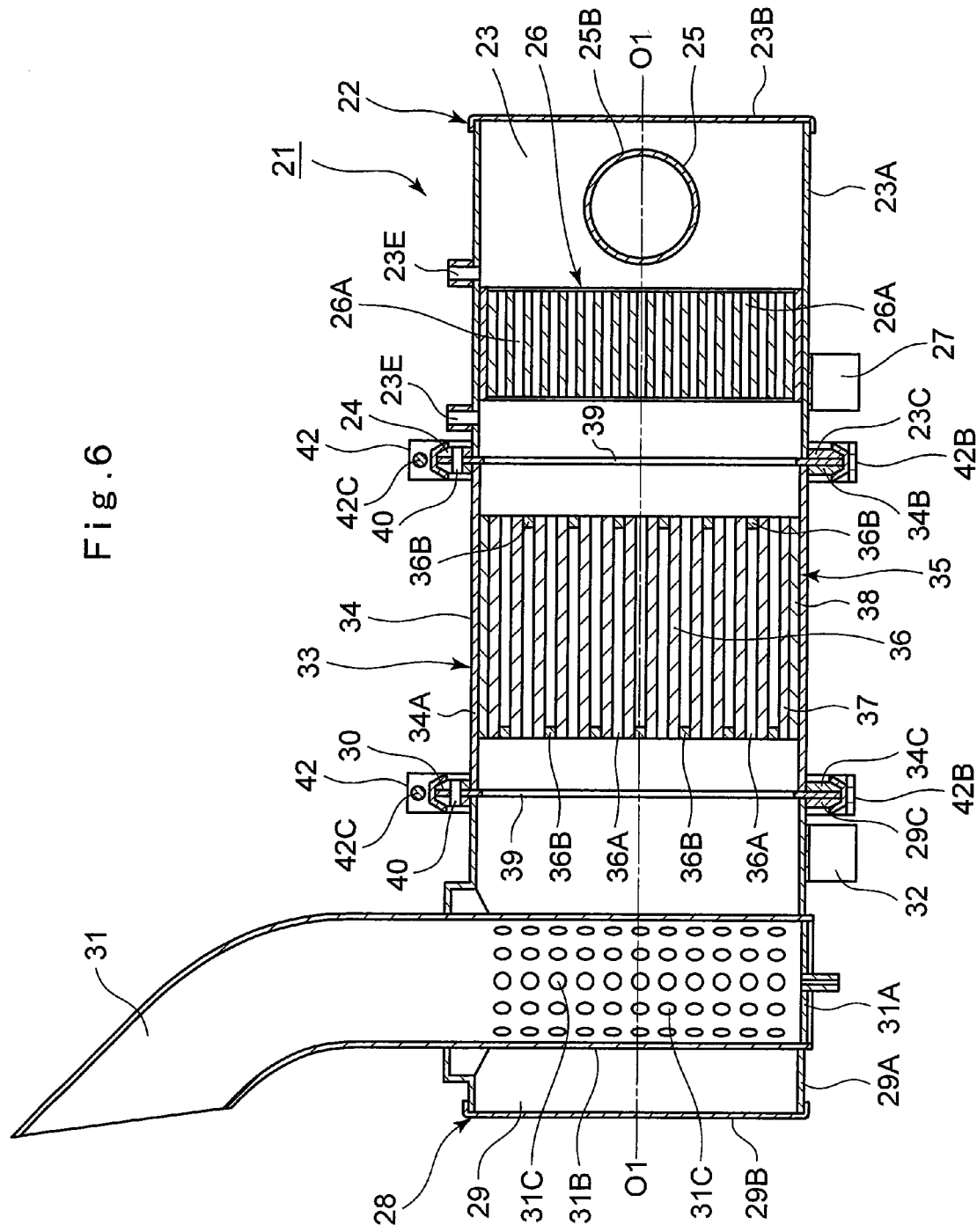
FIG. 6 is a longitudinal sectional view illustrating an internal structure of the exhaust gas treatment device.
Figure 7:
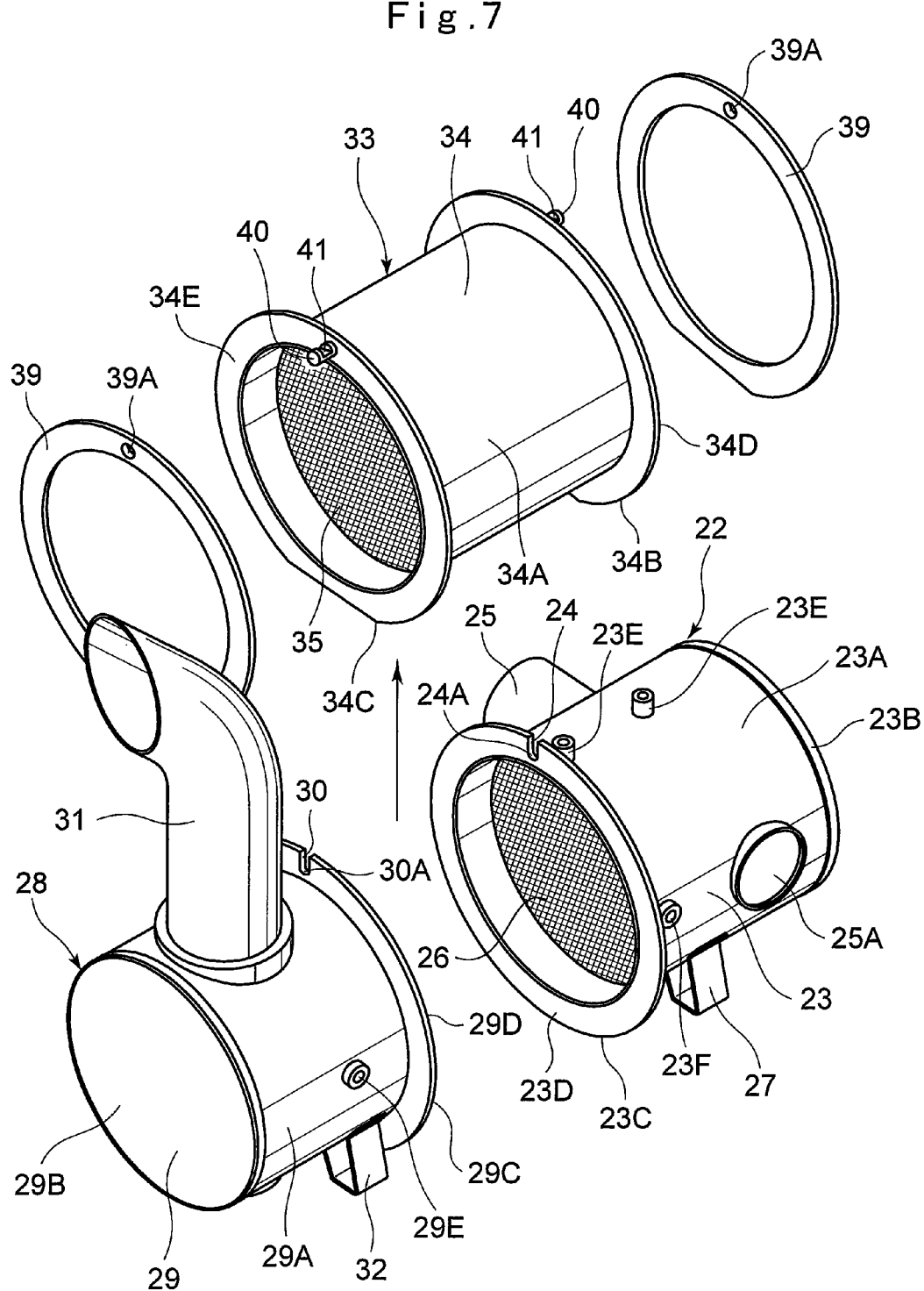
FIG. 7 is an exploded perspective view illustrating a state in which a filter accommodating cylinder and gaskets are removed from an upstream cylinder and a downstream cylinder.
Figure 8:
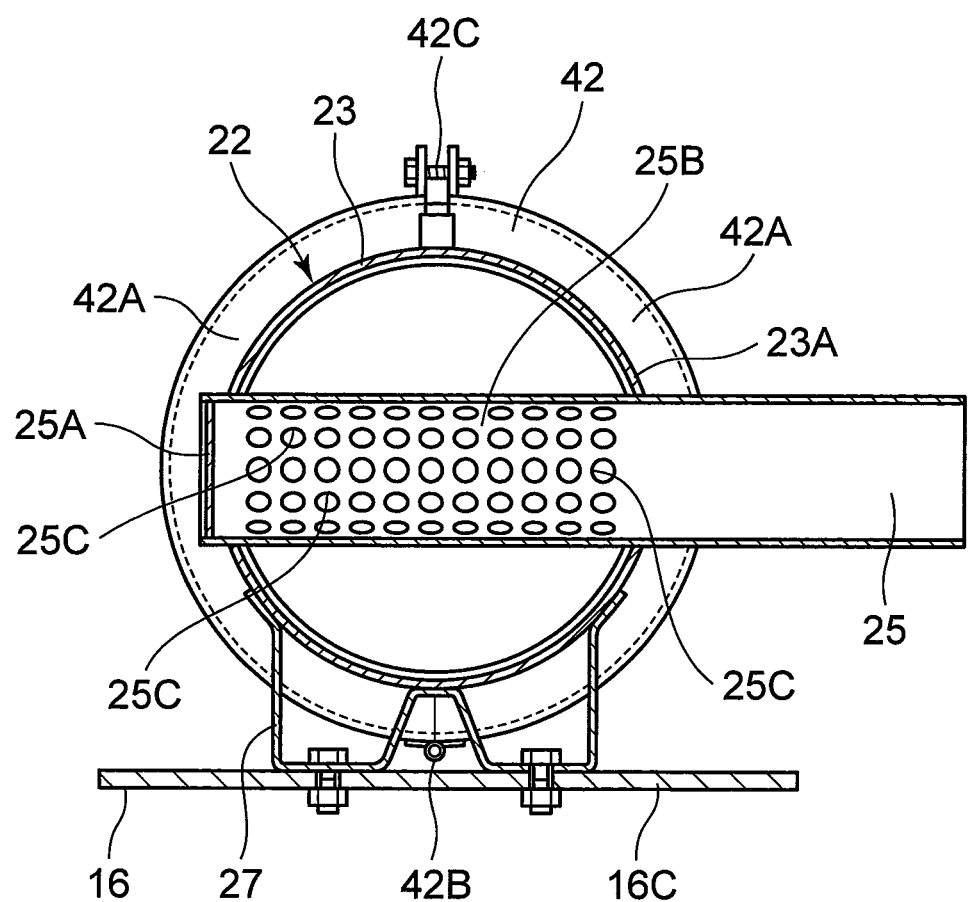
FIG. 8 is an enlarged cross-sectional view, taken from a direction of arrows VIII-VIII in FIG. 4, of a state in which an upstream cylinder is mounted on a treatment device supporting bracket.

As shown in FIGS. 3 to 6, the exhaust gas treatment device 21 is constructed such that three cylinders, namely, an upstream cylinder 22, a downstream cylinder 28, and a filter accommodating cylinder 33 serving as a purifying part cylinder, which will be described hereinafter, are connected in series with each other in such a manner that axis line O1-O1 passing through axis centers thereof bring into alignment. As shown in FIG. 7 and FIG. 8, a muffler cylinder 25B of an inlet pipe 25 and the oxidation catalyst 26 to be described later are accommodated in the upstream cylinder 22, a muffler cylinder 31B of an outlet pipe 31 to be described later is accommodated in the downstream cylinder 28 and the DPF 35 to be described later is accommodated in the filter accommodating cylinder 33.

Here, denoted at 22 is the upstream cylinder which is positioned at the front portion side of the exhaust gas treatment device 21 and provided on the upstream side of the exhaust gas passage. The upstream cylinder 22 constitutes an inlet portion into which an exhaust gas flows. As shown in FIG. 6 and FIG. 7, the upstream cylinder 22 is largely constituted by a cylindrical case 23, an inlet pipe 25, the oxidation catalyst 26 and a support leg 27, which will be described hereinafter.

Indicated at 23 is the cylindrical case for forming an outer shell of the upstream cylinder 22. The cylindrical case 23 is constituted by a cylindrical portion 23A having a large-diameter cylindrical shape, a lid portion 23B provided by closing a front side (upstream side) of the cylindrical portion 23A, and a flange portion 23C provided in the form of a collar shape over the entire circumference at an end portion of a rear side (downstream side) of the cylindrical portion 23A.

Here, as shown in FIG. 5 and the like, the flange portion 23C is connected through a gasket 39 to be described later to a front side flange portion 34B of a cylindrical case 34 to be described later, and a connecting surface 23D of the flange portion 23C is formed as a circular flat surface perpendicular to the axis line O1-O1. An upper portion side of the flange portion 23C is provided with a notched groove 24 to be described hereinafter.

Figure 3:
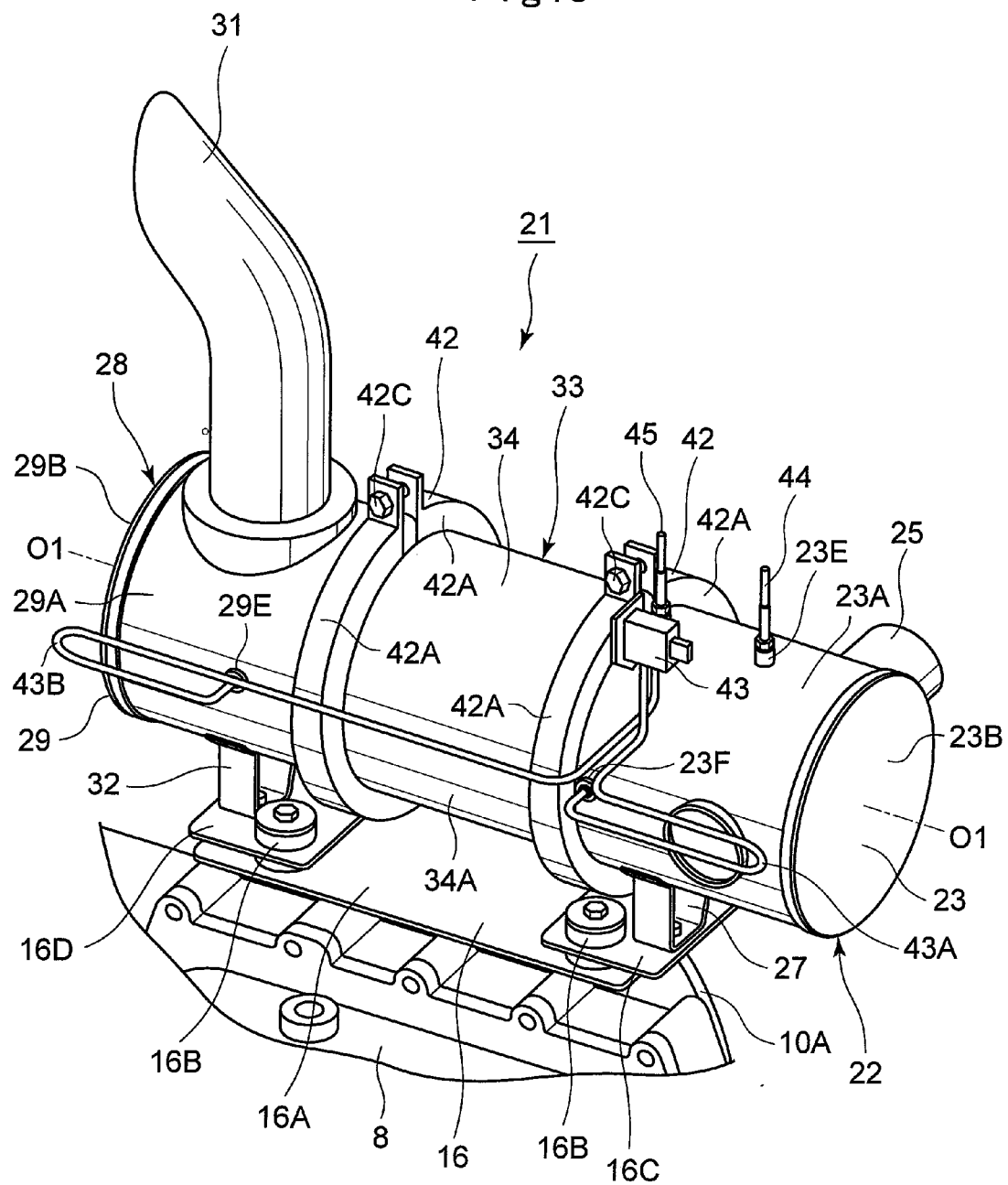
FIG. 3 is an enlarged perspective view of essential portions of the exhaust gas treatment device as mounted on an engine.

Two temperature sensor mounting ports 23E are provided in the cylindrical case 23 to be positioned at an upper part of the cylindrical portion 23A. These two temperature sensor mounting ports 23E are for mounting below-described temperature sensors 44 and 45 and are disposed at two locations so as to sandwich the below-described oxidation catalyst 26 in the front and rear directions, as shown in FIGS. 3 and 4. Further, an upstream side pressure pick out portion 23F is provided at a rear side position of the cylindrical portion 23A to be positioned at the right side, for example. The pressure pick out portion 23F picks out an upstream side pressure of the DPF 35 to be described later among pressures of the exhaust gas flowing in the exhaust gas passage and a below-described pressure sensor 43 being arranged to be connected to the pressure pick out portion 23F through an upstream side pipe 43A.

Denoted at 24 is the notched groove provided at an upper portion side of the flange portion 23C in the cylindrical case 23 constituting the upstream cylinder 22. A positioning pin 40 of the filter accommodating cylinder 33 to be described later is engaged with the notched groove 24. As shown in FIG. 7, the notched groove 24 is formed as one longitudinal groove linearly extending in an upward and downward directions by notching an upper end side of the flange portion 23C from an outer peripheral edge portion toward a center thereof, and a lower end portion of the notched groove 24 is formed as a groove bottom 24A.

When the positioning pin 40 of the filter accommodating cylinder 33 is engaged with the notched groove 24, the notched groove 24 guides the filter accommodating cylinder 33 in a radial direction to the upstream cylinder 22 and positions the filter accommodating cylinder 33 to be coaxial with the upstream cylinder 22 in a state where the positioning pin 40 abut against the groove bottom 24A of the notched groove 24.

Indicated at 25 is the inlet pipe which is provided on the front side (upstream side) of the cylindrical case 23, and the inlet pipe 25 penetrates the cylindrical portion 23A of the cylindrical case 23 in the radial direction (see FIG. 8). As shown in FIG. 2, one end side of the inlet pipe 25 projecting from the cylindrical case 23, extends in the left side direction toward the exhaust pipe 9 and is connected to the exhaust pipe 9. The other end side of the inlet pipe 25 is closed by a closing plate 25A. The inlet pipe 25 constitutes a muffler cylinder 25B inside the cylindrical case 23, and when an exhaust gas passes through many small diameter passages 25C disposed in the muffler cylinder 25B, exhaust noises can be reduced.

Indicated at 26 is the oxidation catalyst to be accommodated in the cylindrical case 23 positioned in the downstream side of the inlet pipe 25, and the oxidation catalyst 26 constitutes one of treatment members for effecting the purification treatment of the exhaust gas. As shown in FIGS. 6 and 7, the oxidation catalyst 26 is formed by a ceramic-made cellular cylindrical body having an outer diameter dimension equivalent to an inner diameter dimension of the cylindrical portion 23A. A multiplicity of through holes 26A are formed in the axial direction of the oxidation catalyst 26 and an inner surface of the oxidation catalyst 26 is coated with a noble metal such as platinum (Pt). As the exhaust gas is circulated through each of the through holes 26A at a predetermined temperature, the oxidation catalyst 26 oxidizes and removes carbon monoxides (CO), hydrocarbon (HC) and the like contained in the exhaust gas and removes nitrogen oxides (NO) therein as nitrogen dioxides ($NO_2$).

Indicated at 27 is the support leg as a support member provided at the lower surface side of the cylindrical case 23 (cylindrical portion 23A). As shown in FIG. 8, the support leg 27 is formed, for example, by bending a plate to be in a substantially W-shape, and upper end sides thereof are secured to a lower surface of the cylindrical portion 23A by welding means or the like. A lower end side of the support leg 27 is bolted to the front side mounting plate 16C of the treatment device supporting bracket 16. In this way, the upstream cylinder 22 is fixed through the support leg 27 to the treatment device supporting bracket 16 mounted to the side of the upper revolving structure 4.

Next, designated at 28 is the downstream cylinder positioned in the rear portion side of the exhaust gas treatment device 21 to be provided in the downstream side of the upstream cylinder 22. The downstream cylinder 28 is disposed at the opposite side to the upstream cylinder 22 to sandwich the filter accommodating cylinder 33 to be described later therebetween and constitutes an outlet portion for discharging an exhaust gas. As shown in FIGS. 5 and 7, the downstream cylinder 28 is largely constituted by a cylindrical case 29, an outlet pipe 31, and a support leg 32, which will be described hereinafter.

Indicated at 29 is the cylindrical case for forming an outer shell of the downstream cylinder 28. In substantially the same way as the cylindrical case 23 of the upstream cylinder 22, the cylindrical case 29 is constituted by a cylindrical portion 29A having a large-diameter cylindrical shape, a lid portion 29B provided by closing a rear side (downstream side) of the cylindrical portion 29A, and a flange portion 29C which is provided in the form of a collar shape over the entire circumference at an edge portion of a front side (upstream side) of the cylindrical portion 29A.

As shown in FIG. 7 and the like, the flange portion 29C is connected to the rear side flange portion 34C of the cylindrical case 34 to be described later through the gasket 39. Therefore, a connecting surface 29D of the flange portion 29C is formed as a circular flat surface perpendicular to an axis line O1-O1. Further, the flange portion 29C is provided with a notched groove 30 which will be described hereinafter.

A downstream pressure pick out portion 29E is provided in the rear side position of the cylindrical portion 29A to be positioned, for example, at the right side. The pressure pick out portion 29E picks out a pressure at downstream side of the DPF 35 among pressures of the exhaust gas flowing in the exhaust gas passage, and a pressure sensor 43 to be described later is connected through a downstream side pipe 43B to the pressure pick out portion 29E.

Indicated at 30 is a notched groove disposed at an upper portion side of the flange portion 29C in the cylindrical case 29 which constitutes the downstream cylinder 28. The positioning pin 40 of the filter accommodating cylinder 33 is engaged with the notched groove 30 which is positioned to substantially directly oppose in a front and rear directions to the notched groove 24 provided in the flange portion 23C of the upstream cylinder 22. As shown in FIG. 7, the notched groove 30 is formed as one longitudinal groove linearly extending in an upward and downward directions by notching an upper end side of the flange portion 29C from an outer peripheral edge portion to a center thereof, and a lower end portion of the notched groove 30 is formed as a groove bottom 30A.

When the positioning pin 40 of the filter accommodating cylinder 33 is engaged with the notched groove 30, the notched groove 30 guides the filter accommodating cylinder 33 in a radial direction to the downstream cylinder 28 and positions the filter accommodating cylinder 33 to be coaxial with the downstream cylinder 28 in a state where the positioning pin 40 is in contact with the groove bottom 30A of the notched groove 30.

Indicated at 31 is the outlet pipe which is called a tail pipe provided at the rear side (downstream side) of the cylindrical case 29. The outlet pipe 31 penetrates the cylindrical portion 29A of the cylindrical case 29 in the radial direction (see FIG. 6). An upper end side of the outlet pipe 31 projecting from the cylindrical case 29 extends upwards above the housing cover 15 shown in FIG. 1 to be opened to an atmosphere. On the other hand, a lower end side of the outlet pipe 31 is closed by a closing plate 31A. The outlet pipe 31 constitutes the muffler cylinder 31B inside the cylindrical case 29. Exhaust noises are reduced by the passing of an exhaust gas through many small diameter passages 31C formed in the muffler cylinder 31B.

Indicated at 32 is the support leg as a support member provided at the lower surface side of the cylindrical case 29 (cylindrical portion 29A). As similar to the support leg 27 of the upstream cylinder 22, the support leg 32 is formed by bending a plate to be in a substantially W-shape and upper end sides thereof are secured to a lower surface of the cylindrical portion 29A. A lower end side of the support leg 32 is bolted to a rear side mounting plate 16D of the treatment device supporting bracket 16. In this way, the downstream cylinder 28 is fixed through the support leg 32 to the treatment device supporting bracket 16 mounted to the side of the upper revolving structure 4.

Next, designated at 33 is one filter accommodating cylinder in series connected between the upstream cylinder 22 and the downstream cylinder 28. This filter accommodating cylinder 33 constitutes a purifying part cylinder for accommodating a treatment member therein for purifying an exhaust gas. Here, as shown in FIG. 6 and FIG. 7, the filter accommodating cylinder 33 is largely constituted by a cylindrical case 34 and the DPF 35, which will be described hereinafter.

Indicated at 34 is the cylindrical case constituting an outer shell of the filter accommodating cylinder 33. The cylindrical case 34 accommodates the DPF 35 therein. The cylindrical case 34 is largely constituted by a cylindrical portion 34A having an outer diameter dimension substantially equal to that of each of the cylindrical case 23 of the upstream cylinder 22 and the cylindrical case 29 of the downstream cylinder 28, a front side flange portion 34B provided in a form of a collar shape over the entire circumference at an end portion of the front side (upstream side) of the cylindrical portion 34A and a rear side flange portion 34C provided in a form of a collar shape over the entire circumference at an end portion of the rear side (downstream side) of the cylindrical portion 34A.

Here, the front side flange portion 34B is connected to the flange portion 23C of the upstream cylinder 22 (the cylindrical case 23) through the gasket 39 to be described later. A connecting surface 34D of the front side flange portion 34B is formed as a circular flat surface perpendicular to the axis line O1-O1. On the other hand, the rear side flange portion 34C is connected to the flange portion 29C of the downstream cylinder 28 (the cylindrical case 29) through the gasket 39. A connecting surface 34E of the rear side flange portion 34C is formed as a circular flat surface perpendicular to the axis line O1-O1. The front side flange portion 34B and the rear side flange portion 34C are constituted to provide positioning pins 40 to be described later, respectively.

Indicated at 35 is a DPF (a particulate matter removing filter) accommodated in the cylindrical case 34. This DPF 35 constitutes one of the treatment members. As shown in FIG. 6, the DPF 35 is largely constituted by a filter body 36 formed into a cylindrical shape by a porous member such as a ceramic material, a buffer material layer 37 provided on the outer peripheral side of the filter body 36 over the entire circumference, and a heat insulating layer 38 provided on the outer peripheral side of the buffer material layer 37 over the entire circumference.

The filter body 36 has a cellular cylindrical body of a honeycomb structure provided with a multiplicity of small diameter passages 36A along an axial direction, and contiguously alternate and different end portions of the small diameter passages 36A are each closed by a sealing member 36B. As the exhaust gas flowing into each of the small diameter passages 36A from the upstream side is passed through the porous material, the filter body 36 captures particulate matters and causes the exhaust gas alone to flow out to the downstream side through the adjacent small diameter passages 36A.

In this instance, the particulate matter captured by the filter body 36 is burned and removed, but part of it gradually deposited in the small diameter passages 36A as ashes. In addition, other unburned residues such as heavy metals, calcium and the like in engine oil are also gradually deposited. Accordingly, the arrangement provided is such that the pressure on the upstream side of the DPF 35 and the pressure on the downstream side thereof are measured by the below-described pressure sensor 43, and when a pressure difference between the upstream side and the downstream side has reached a predetermined value, the DPF 35 is removed from the cylindrical case 34 of the filter accommodating cylinder 33 to clean the deposits.

Next, denoted at 39 are two sheets of gaskets. One of the gaskets 39 is provided between the cylindrical case 23 of the upstream cylinder 22 and the cylindrical case 34 of the filter accommodating cylinder 33, and the other of the gaskets 39 is provided between the cylindrical case 29 of the downstream cylinder 28 and the cylindrical case 34 of the filter accommodating cylinder 33. Here, as shown in FIG. 6 and FIG. 7, each gasket 39 is formed by use of, for example, a metallic plate such as stainless, as a circular plate substantially similar to each of the front side flange portion 34B and the rear side flange portion 34C of the cylindrical case 34.

The respective gaskets 39 air-tightly seal a connecting portion between the flange portion 23C of the cylindrical case 23 and the front side flange portion 34B of the cylindrical case 34 and a connecting portion between the flange portion 29C of the cylindrical case 29 and the rear side flange portion 34C of the cylindrical case 34. One pin passage hole 39A through which the below-described positioning pin 40 is inserted is formed at an upper end side of each gasket 39.

Indicated at 40 are two positioning pins, and these positioning pins 40 are provided at each of the front side flange portion 34B and the rear side flange portion 34C of the cylindrical case 34 constituting the filter accommodating cylinder 33. These positioning pins 40, as shown in FIG. 9 to FIG. 13, latch on the gaskets 39 for the retaining and are engaged with the notched groove 24 provided in the flange portion 23C of the upstream cylinder 22 and the notched groove 30 provided in the flange portion 29C of the downstream cylinder 28.

Here, each positioning pin 40 is formed of a columnar pin having a slightly smaller diameter than a groove width of each of the notched groove 24 and the notched groove 30 as a whole and is secured to the front side flange portion 34B and the rear side flange portion 34C by use of press fitting means, for example. The positioning pin 40 disposed in the front side flange portion 34B projects from the connecting surface 34D of the front side flange portion 34B toward the upstream cylinder 22 and the positioning pin 40 disposed in the rear side flange portion 34C projects from the connecting surface 34E of the rear side flange portion 34C toward the downstream cylinder 28.

Figure 9:
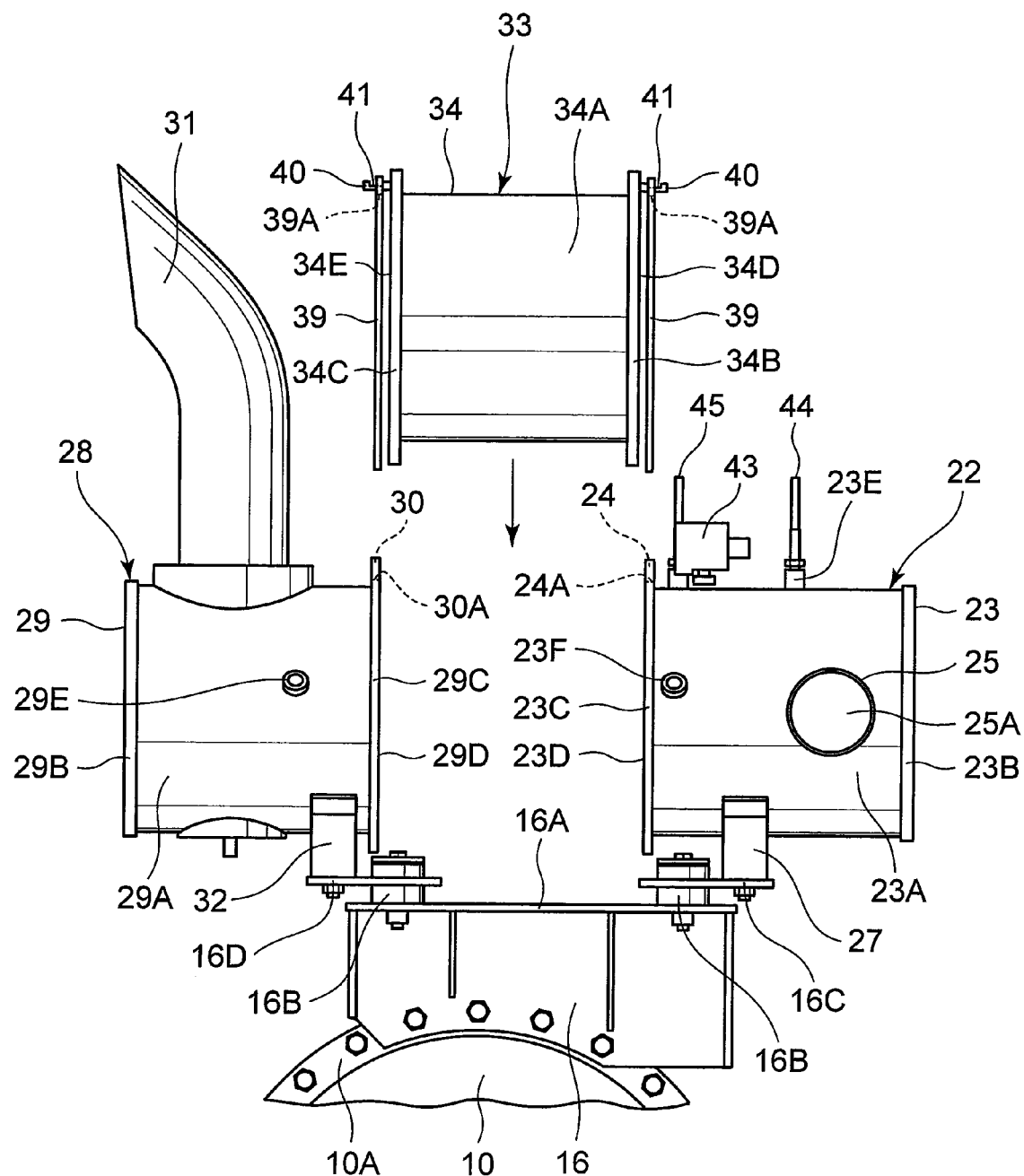
FIG. 9 is a front view illustrating a state of connecting the filter accommodating cylinder between the upstream cylinder and the downstream cylinder.

Therefore, as shown in FIG. 9, in a state where each gasket 39 latches on the each positioning pin 40 for holding, when the filter accommodating cylinder 33 is inserted between the upstream cylinder 22 and the downstream cylinder 28 and the positioning pins 40 are engaged with the notched groove 24 disposed in the flange portion 23C of the upstream cylinder 22 and the notched groove 30 disposed in the flange portion 29C of the downstream cylinder 28, the filter accommodating cylinder 33 can be positioned to be coaxial with the axis line O1-O1 to the upstream cylinder 22 and the downstream cylinder 28. A recessed portion 41 to be described later is formed in an intermediate portion of each positioning pin 40.

Figure 10:
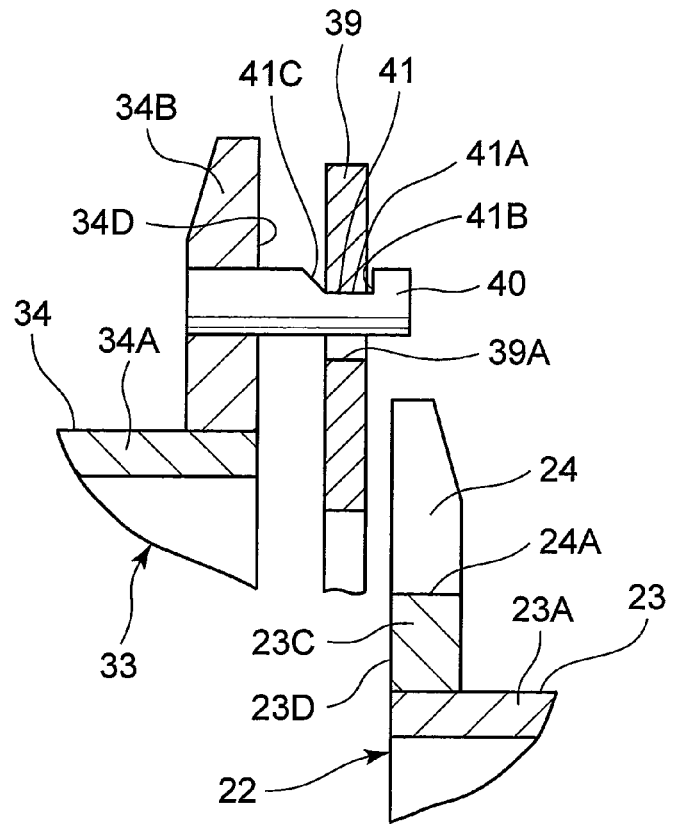
FIG. 10 is an enlarged cross-sectional view of essential portions illustrating a state in which a pin passage hole of a gasket is fitted over the positioning pin of the filter accommodating cylinder.

Indicated at 41 is the recessed portion as an engaging portion disposed in the intermediate portion of each positioning portion 40. As shown in FIG. 10, the recessed portion 41 is formed by notching an upper surface side of the positioning pin 40 to have a substantially U-shape in section. When the pin passage hole 39A of the gasket 39 is inserted into the positioning pin 40, a peripheral edge portion of the pin passage hole 39A falls in and is engaged with the recessed portion 41, and thereby, the gasket 39 is restricted to move in an axial direction of the positioning pin 40. Here, the recessed portion 41 includes a groove bottom surface 41A positioned at intermediate portion in the axial direction of the positioning pin 40, a vertical surface 41B positioned at a front end side of the positioning pin 40 and rising up in a vertical direction from the groove bottom surface 41A, and an inclined surface 41C positioned at a base end side of the positioning pin 40 and rising up diagonally upwards from the groove bottom surface 41A toward the cylindrical case 34.

Figure 11:
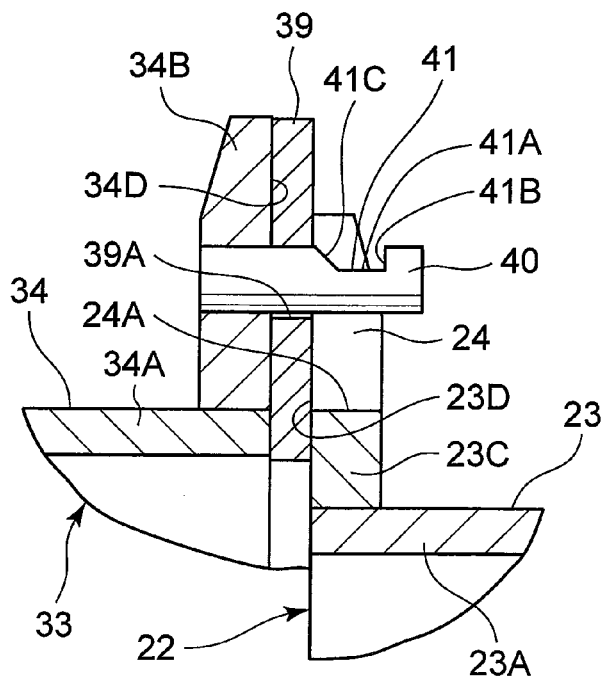
FIG. 11 is an enlarged cross-sectional view of essential portions illustrating a state in which the positioning pin of the filter accommodating cylinder is inserted into the notched groove in the upstream cylinder.

In consequence, as shown in FIG. 10, in a state where the pin passage hole 39A of the gasket 39 is engaged with the groove bottom surface 41A of the recessed portion 41, when a peripheral edge portion of the pin passage hole 39A of the gasket 39 is in contact with the vertical surface 41B of the recessed portion 41, it can be prevented for the gasket 39 to be disengaged from the positioning pin 40. On the other hand, as shown in FIG. 11, in a case where the gasket 39 is moved to the side of the cylindrical case 34, when an inner peripheral edge portion of the pin passage hole 39A in the gasket 39 moves along the inclined surface 41C of the recessed portion 41, a hole center of the pin passage hole 39A in the gasket 39 can be made to correspond to an axis center of the positioning pin 40 to position the gasket 39 to be coaxial with the cylindrical case 34.

On the other hand, denoted at 42 are two sets of clamping devices. One of the clamping devices 42 detachably connects the upstream cylinder 22 and the filter accommodating cylinder 33 and the other clamping devices 42 detachably connects the downstream cylinder 28 and the filter accommodating cylinder 33. As shown in FIG. 6 and FIG. 8, each of these clamping devices 42 is largely constituted by two semi-circular frame bodies 42A each having a substantially V-shape in section, a hinge portion 42B rotatably connecting one end sides of the respective frame bodies 42A, and a connecting portion 42C of a bolt and nut type connecting the other end sides of the respective frame bodies 42A.

One of the clamping devices 42 axially clamps the flange portion 23C of the upstream cylinder 22 and the front side flange portion 34B of the filter accommodating cylinder 33 to sandwich the gasket 39 therebetween, and the other of the clamping devices 42 axially clamps the flange portion 29C of the downstream cylinder 28 and the rear side flange portion 34C of the filter accommodating cylinder 33 to sandwich the gasket 39 therebetween.

Denoted at 43 is the pressure sensor which is provided on the outer peripheral side of the upstream cylinder 22, and the pressure sensor 43 detects pressures of (pressure difference) between the upstream side and the downstream side of the DPF 35 so as to estimate the amount of deposits of the particulate matter, unburned residues and the like. The pressure sensor 43 has its upstream side pipe 43A connected to the pressure pick out portion 23F at the cylindrical case 23 of the upstream cylinder 22 and its downstream side pipe 43B connected to the pressure pick out portion 29E at the cylindrical case 29 of the downstream cylinder 28.

Denoted at 44 is the upstream side temperature sensor provided on the upstream side of the cylindrical case 23 of the upstream cylinder 22, and the upstream side temperature sensor 44 is mounted at the temperature sensor mounting port 23E located on the upstream side of the cylindrical case 23, and is connected to a controller (not shown). Further, the upstream side temperature sensor 44 is for detecting the temperature of the exhaust gas flowing into the cylindrical case 23, so as to confirm whether or not the temperature is such as to allow the oxidation catalyst 26 to function.

Denoted at 45 is the downstream side temperature sensor provided on the downstream side of the cylindrical case 23 of the upstream cylinder 22. This downstream side temperature sensor 45 is for detecting the temperature of the exhaust gas which has passed through the oxidation catalyst 26, so as to confirm whether or not the oxidation (regeneration) of the particulate matter captured by the DPF 35 is possible.

The exhaust gas treatment device 21 according to the present embodiment has the aforementioned construction, and when the engine 8 is started to perform an excavating operation or the like by the hydraulic excavator 1, an exhaust gas containing harmful substances such as a particulate matter, nitrogen oxides and the like is emitted from the engine 8 through the exhaust pipe 9, and this exhaust gas is introduced into the exhaust gas treatment device 21 through the inlet pipe 25.

At this time, when the exhaust gas passes through the oxidation catalyst 26 accommodated in the upstream cylinder 22, the exhaust gas treatment device 21 oxidizes and removes carbon monoxide (CO), hydrocarbons (HC) and the like contained in this exhaust gas. Further, when the exhaust gas which passed through the oxidation catalyst 26 passes through the DPF 35 accommodated in the filter accommodating cylinder 33, the particulate matter contained in the exhaust gas is captured by the filter body 38 of this DPF 35. The captured particulate matter is burned (regenerated) for removal.

The exhaust gas thus purified by the exhaust gas treatment device 21 is muffled by the muffler cylinder 31B of the outlet pipe 31 in the downstream cylinder 28, and is thereafter discharged through the outlet pipe 31 to an outside.

Thus, the particulate matter captured by the filter body 36 of the DPF 35 is burned and removed, but part of it is reduced to ashes and is gradually deposited in the small diameter passages 36A of the filter body 36. Other unburned residues, such as heavy metals, calcium and the like in engine oil, are also gradually deposited.

For this reason, a pressure difference between the pressure on the upstream side of the DPF 35 and the pressure on the downstream side thereof is measured by the pressure sensor 43, and when this pressure difference has reached a predetermined value, it is necessary to remove the DPF 35 from the cylindrical case 34 of the filter accommodating cylinder 33 and clean the deposits.

Accordingly, a cleaning operation for removing the particulate matter deposited in the DPF 35 will be described.

In performing this cleaning operation, the clamping device 42 for connecting the flange portion 23C of the upstream cylinder 22 to the front side flange portion 34B of the filter accommodating cylinder 33 is removed, and next, the clamping device 42 for connecting the flange portion 29C of the downstream cylinder 28 to the rear side flange portion 34C of the filter accommodating cylinder 33 is removed. Thereby, in a state where the upstream cylinder 22 is fixed through the support leg 27 to the treatment device supporting bracket 16 and the downstream cylinder 28 is fixed through the support leg 32 to the treatment device supporting bracket 16, the filter accommodating cylinder 33 can be singly removed upward from the upstream cylinder 22 and the downstream cylinder 28 which are fixed to the side of the upper revolving structure 4.

In this way, the filter accommodating cylinder 33 can be singly removed upward from the upstream cylinder 22 and the downstream cylinder 28. Therefore, even in cases where the exhaust gas treatment device 21 is disposed in a narrow space within the housing cover 15 together with mounted equipment such as the engine 8, the hydraulic pump 10 and the like, the operator is able to remove only the filter accommodating cylinder 33 safely and easily without being hampered by other mounted equipments.

Further, it is possible to clean the DPF 35 by blowing compressed air by using, for instance, an air spray gun onto the filter body 36 of the DPF 35 accommodated in the filter accommodating cylinder 33 to remove ashes of the particulate matter and unburned residues deposited in the small diameter passages 36A.

After the DPF 35 is thus cleaned, the filter accommodating cylinder 33 with this DPF 35 accommodated therein is once again connected between the upstream cylinder 22 and the downstream cylinder 28.

In a case of performing an operation for connecting the filter accommodating filter 33, first, as shown in FIG. 9, the pin passage hole 39A of each gasket 39 is inserted into each of the positioning pins 40 disposed at the front and rear side of the filter accommodating cylinder 33 to temporarily engage the gaskets 39 respectively with the front side flange portion 34B and the rear side flange portion 34C of the filter accommodating cylinder 33. Next, in this state, the filter accommodating cylinder 33 is inserted between the upstream cylinder 22 and the downstream cylinder 28. Thereby, the connecting surface 34D of the front side flange portion 34B in the filter accommodating cylinder 33 and the connecting surface 23D of the flange portion 23C in the upstream cylinder 22 can oppose with each other through the gasket 39, and the connecting surface 34E of the rear side flange portion 34C in the filter accommodating cylinder 33 and the connecting surface 29D of the flange portion 29C in the downstream cylinder 28 can oppose with each other through the gasket 39.

Figure 12:
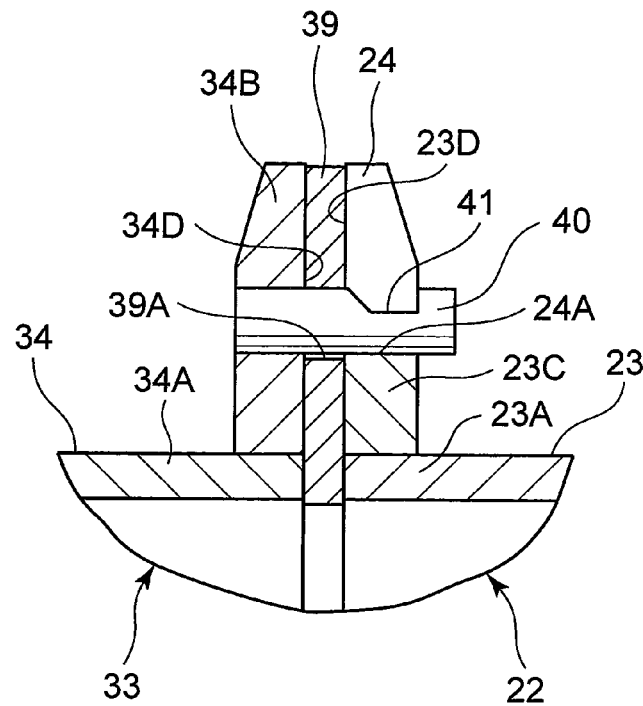
FIG. 12 is an enlarged cross-sectional view of essential portions illustrating a state in which the positioning pin of the filter accommodating cylinder abuts against a groove bottom of the notched groove.

At this time, as shown in FIG. 10 and in FIG. 11, the positioning pin 40 disposed at the front side flange portion 34B in the filter accommodating cylinder 33 is engaged with the notched groove 24 disposed at the flange portion 23C of the upstream cylinder 22, and likewise the positioning pin 40 disposed at the rear side flange portion 34C in the filter accommodating cylinder 33 is engaged with the notched groove 30 disposed at the flange portion 29C in the downstream cylinder 28. As shown in FIG. 12, in a state where the positioning pin 40 disposed at the front side flange portion 34B is in contact with the groove bottom 24A of the notched groove 24 and as similar thereto, the positioning pin 40 disposed at the rear side flange portion 34C is in contact with the groove bottom 30A of the notched groove 30, the filter accommodating cylinder 33 can be positioned to be coaxial with the upstream cylinder 22 and the downstream cylinder 28.

Figure 13:
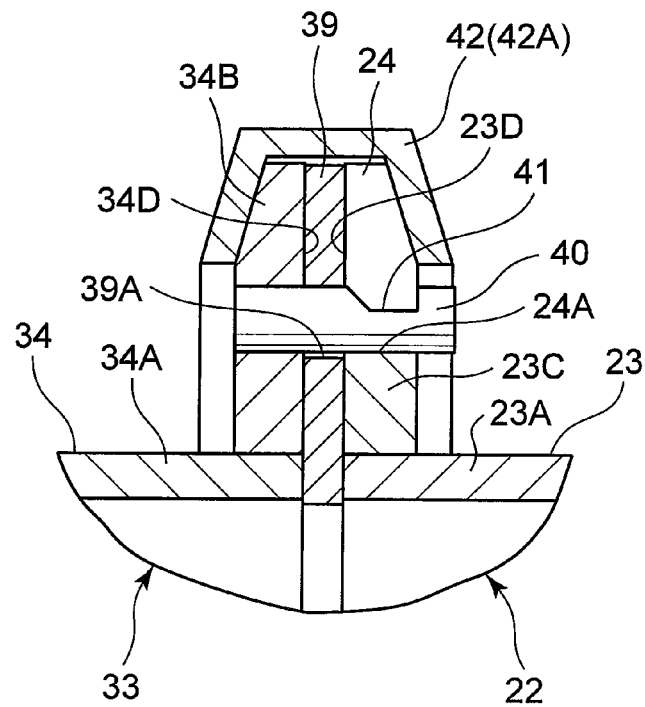
FIG. 13 is an enlarged cross-sectional view of essential portions illustrating a state in which a front side flange portion of the filter accommodating cylinder and a flange portion of the upstream cylinder are fixed by a clamping device.

In a state of thus positioning the filter accommodating cylinder 33 to be coaxial in the axis line O1-O1 with the upstream cylinder 22 and the downstream cylinder 28, the front side flange portion 34B in the filter accommodating cylinder 33 and the flange portion 23C in the upstream cylinder 22 are clamped by use of the clamping device 42, as shown in FIG. 13. As similar thereto, the rear side flange portion 34C in the filter accommodating cylinder 33 and the flange portion 29C in the downstream cylinder 28 are clamped using the clamping device 42.

In consequence, as shown in FIG. 8, the flange portion 23C of the upstream cylinder 22 and the front side flange portion 34B of the filter accommodating cylinder 33 can be fixed in a state of being air-tightly sealed by the gasket 39. The flange portion 29C of the downstream cylinder 28 and the rear side flange portion 34C of the filter accommodating cylinder 33 can be fixed in a state of being air-tightly sealed by the gasket 39. Therefore, the upstream cylinder 22, the downstream cylinder 28 and the filter accommodating cylinder 33 can be connected in series along the axis line O1-O1.

Thus, in the exhaust gas treatment device 21 according to the present embodiment, at the time of connecting the filter accommodating cylinder 33 between the upstream cylinder 22 and the downstream cylinder 28, the positioning pin 40 disposed at the front side flange portion 34B in the filter accommodating cylinder 33 is engaged with the notched groove 24 of the upstream cylinder 22 and the positioning pin 40 disposed at the rear side flange portion 34C is engaged with the notched groove 30 of the downstream cylinder 28. In consequence, the filter accommodating cylinder 33 can be positioned to be coaxial with the upstream cylinder 22 and the downstream cylinder 28.

Therefore, after performing cleaning operations such as an inspection operation, a repair operation and the like to the DPF 35 accommodated in the filter accommodating cylinder 33, an operation of reconnecting the filter accommodating cylinder 33 between the upstream cylinder 22 and the downstream cylinder 28 can be quickly and easily performed to enhance an operational efficiency of performing the cleaning operation to the DPF 35.

The pin passage hole 39A of the gasket 39 is inserted into each of the positioning pins 40 disposed at the front side flange portion 34B and the rear side flange portion 34C in the filter accommodating cylinder 33. Accordingly, in a state of temporarily fixing the gasket 39 to each of the front side flange portion 34B and the rear side flange portion 34C in the filter accommodating cylinder 33, the filter accommodating cylinder 33 can be connected between the upstream cylinder 22 and the downstream cylinder 28. As a result, the operation of disposing the gasket 39 between the front side flange portion 34B of the filter accommodating cylinder 33 and the flange portion 23C of the upstream cylinder 22, the operation of disposing the gasket 39 between the rear side flange portion 34C of the filter accommodating cylinder 33 and the flange portion 29C of the downstream cylinder 28 and the operation of connecting the filter accommodating cylinder 33 between the upstream cylinder 22 and the downstream cylinder 28 can be simultaneously performed to furthermore enhance an operational efficiency of connecting the filter accommodating cylinder 33.

Further, each positioning pin 40 of the filter accommodating cylinder 33 is provided with the recessed portion 41 including the groove bottom surface 41A positioned at intermediate portion in an axial direction, the vertical surface 41B rising up from the groove bottom surface 41A, and the inclined surface 41C. In consequence, when the pin passage hole 39A of the gasket 39 is inserted into the positioning pin 40, the pin passage hole 39A of the gasket 39 is engaged with the groove bottom surface 41A of the recessed portion 41. In this state, the peripheral edge portion of the pin passage hole 39A of the gasket 39 latches on the vertical surface 41B of the recessed portion 41, which can prevent the gasket 39 from being inadvertently disengaged from the positioning pin 40.

On the other hand, in a case where the gasket 39 is moved to the side of the cylindrical case 34, the inner peripheral edge portion of the pin passage hole 39A in the gasket 39 moves along the inclined surface 41C of the recessed portion 41. Therefore, the hole center of the pin passage hole 39A in the gasket 39 can be made to correspond to an axis center of the positioning pin 40 to position the gasket 39 to be coaxial with the cylindrical case 34.

As a result, at the time of connecting the filter accommodating cylinder 33 between the upstream cylinder 22 and the downstream cylinder 28, the gaskets 39 can be securely disposed respectively between the front side flange portion 34B of the filter accommodating cylinder 33 and the flange portion 23C of the upstream cylinder 22 and between the rear side flange portion 34C of the filter accommodating cylinder 33 and the flange portion 29C of the downstream cylinder 28.

Figure 14:
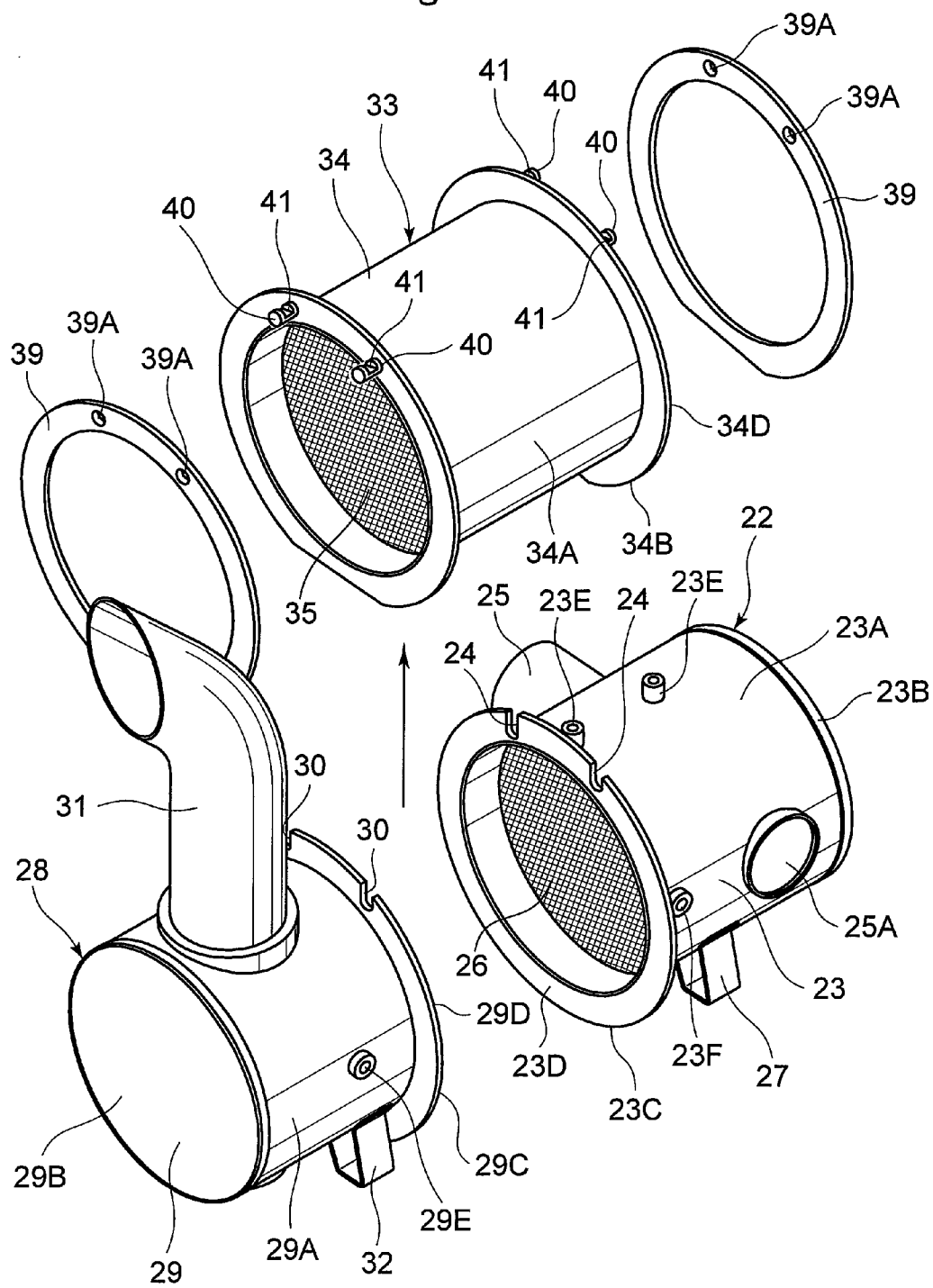
FIG. 14 is an exploded perspective view similar to FIG. 7, illustrating a modification of the positioning pin and the notched groove.

It should be noted that, in the above-described embodiment, the case has been illustrated in which one positioning pin 40 is provided at each of the front side flange portion 34B and the rear side flange portion 34C in the filter accommodating cylinder 33. However, the present invention is not limited to this particular example. As a modification shown in FIG. 14, a configuration may be provided in which two positioning pins 40 may be provided at each of the front side flange portion 34B and the rear side flange portion 34C. In this case, two pin passage holes 39A are provided at each of the gaskets 39, two notched grooves 24 are provided at the flange portion 23C of the upstream cylinder 22 and two notched grooves 30 are provided at the flange portion 29C of the downstream cylinder 28.

Further, the aforementioned embodiment exemplifies a case where the clamping devices 42 are used to connect respectively between the front side flange portion 34B of the filter accommodating cylinder 33 and the flange portion 23C of the upstream cylinder 22 and between the rear side flange portion 34C of the filter accommodating cylinder 33 and the flange portion 29C of the downstream cylinder 28.

Figure 15:
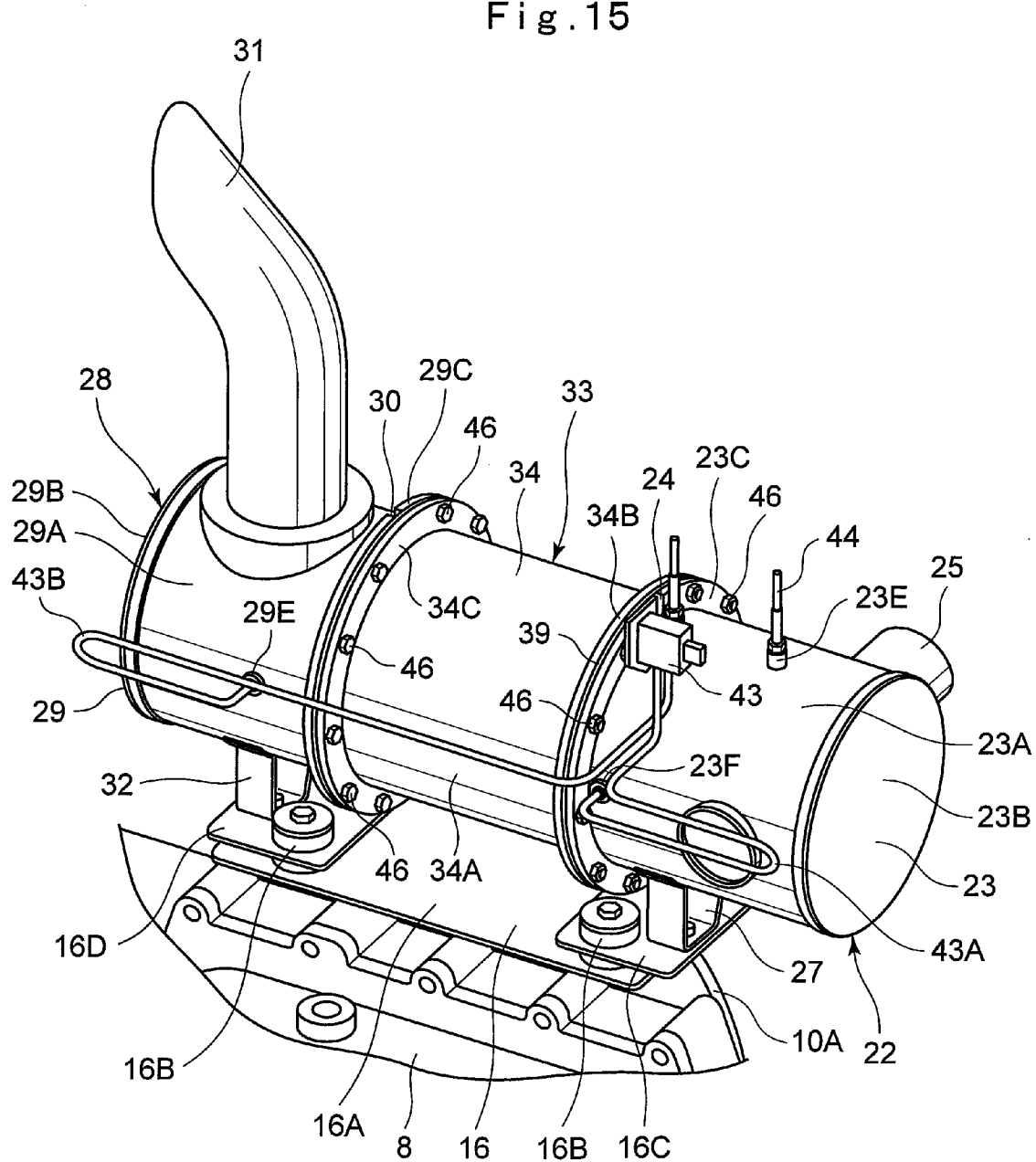
FIG. 15 is a perspective view of the exhaust gas treatment device similar to FIG. 3, illustrating a modification of connecting the upstream cylinder, the downstream cylinder and the filter accommodating cylinder by use of bolts and nuts.

However, the present invention is not limited to this particular example. As another modification shown in FIG. 15, a configuration may be provided in which a plurality of bolts and nuts 46 may be used instead of the clamping device 42 to connect between the front side flange portion 34B and the flange portion 23C and between the rear side flange portion 34C and the flange portion 29C.

In addition, the aforementioned embodiment exemplifies a case where the DPF 35 is used as the treatment member for purifying an exhaust gas. However, the present invention is not limited to this particular example. For instance, a configuration may be provided in which a NOx treatment device may be applied as the exhaust gas treatment device. In this case, a selective reduction catalyst for reducing NOx and a urea water injection valve for injecting urea water to the selective reduction catalyst correspond to the treatment member.

Furthermore, in the above-described embodiment, a description has been given by citing as an example the case in which the exhaust gas treatment device 21 is installed in the hydraulic excavator 1 equipped with the crawler type lower traveling structure 2. However, the present invention is not limited to this particular example. For instance, a configuration may be provided in which the exhaust gas treatment device 21 is installed in a hydraulic excavator equipped with a wheel type lower traveling structure consisting of tires and the like. In addition to these, the exhaust gas treatment device 21 may be installed extensively in other construction machines such as a dump truck, a hydraulic crane and the like.

The invention claimed is:

1. An exhaust gas treatment device comprising an upstream cylinder located at an exhaust gas passage in an engine mounted on a vehicle body, a downstream cylinder located on a downstream side of said upstream cylinder, and a purifying part cylinder mounted in an axis line direction in series and detachably connected between said upstream cylinder and said downstream cylinder, and accommodating a treatment member therein for purifying an exhaust gas, wherein said upstream cylinder is closed at one side in the axial direction which is an upstream side thereof and is provided with a flange portion having a flat connecting surface at the other side in the axial direction, said downstream cylinder is provided with a flange portion having a flat connecting surface at one side in the axial direction thereof and is closed at the other side in the axial direction, said purifying part cylinder is provided with a front side flange portion having a flat connecting surface to be connected to and opposed with said flange portion of said upstream cylinder at one side in the axial direction thereof and is provided with a rear side flange portion having a flat connecting surface to be connected to and opposed with said flange portion of said downstream cylinder at the other side in the axial direction, said flange portion of said upstream cylinder and said front side flange portion of said purifying part cylinder are connected by use of one of a clamping device or a plurality of bolts and nuts, and said flange portion of said downstream cylinder and said rear side flange portion of said purifying part cylinder are connected by use of the other of said one of said clamping device or said plurality of bolts and nuts used to connect said flange portion of said upstream cylinder and said front side flange portion of said purifying part cylinder, wherein said front side flange portion and said rear side flange portion of said purifying part cylinder are provided with positioning pins projecting, respectively, toward said upstream cylinder and said downstream cylinder from said connecting surfaces to align each of said cylinders to be coaxial in said axis line direction, said flange portion of said upstream cylinder and said flange portion of said downstream cylinder are provided with notched grooves for positioning said purifying part cylinder relative to said upstream cylinder and said downstream cylinder by engaging with said positioning pins, and each of said notched grooves is formed as a notch in said flange portions extending from an outer peripheral edge portion toward a center thereof.

2. An exhaust gas treatment device according to claim 1, wherein said flange portion of said upstream cylinder, said flange portion of said downstream cylinder and each of said flange portions of said purifying part cylinder are respectively formed as said connecting surface to be flat in a direction perpendicular to an axis line of each.

3. An exhaust gas treatment device according to claim 1, wherein said upstream cylinder and said downstream cylinder are fixed through a support member to the side of said vehicle body, respectively.

4. An exhaust gas treatment device according to claim 1, wherein gaskets are disposed respectively between said upstream cylinder and said purifying part cylinder and between said downstream cylinder and said purifying part cylinder, said each gasket is provided with a pin passage hole into which said positioning pin is inserted, and said positioning pins respectively are engaged with said notched groove of said upstream cylinder and said notched groove of said downstream cylinder in a state where said pin passage hole of said each gasket is inserted into said positioning pin.

5. An exhaust gas treatment device according to claim 4, wherein said positioning pin is provided with an engaging portion with which said gasket is engaged in a state where said pin passage hole of said gasket is inserted into said positioning pin.

* * * * *